US011270059B2

(12) United States Patent
Li et al.

(10) Patent No.: US 11,270,059 B2
(45) Date of Patent: Mar. 8, 2022

(54) MACHINE LEARNING MODEL-BASED CONTENT PROCESSING FRAMEWORK

(71) Applicant: Microsoft Technology Licensing, LLC, Redmond, WA (US)

(72) Inventors: Ji Li, San Jose, CA (US); Xiaozhi Yu, San Jose, CA (US); Gregory Alexander DePaul, San Jose, CA (US); Youjun Liu, San Jose, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/552,210

(22) Filed: Aug. 27, 2019

(65) Prior Publication Data
US 2021/0064690 A1 Mar. 4, 2021

(51) Int. Cl.
*G06F 40/106* (2020.01)
*G06N 20/00* (2019.01)
(52) U.S. Cl.
CPC ........... *G06F 40/106* (2020.01); *G06N 20/00* (2019.01)
(58) Field of Classification Search
CPC .................. G06F 40/106; G06N 20/00
See application file for complete search history.

(56) References Cited

U.S. PATENT DOCUMENTS

| 7,003,736 B2* | 2/2006 | Kanevsky | G06F 3/04817 715/837 |
| 2019/0122403 A1* | 4/2019 | Woo | G06N 20/00 |
| 2019/0205434 A1* | 7/2019 | Gattiker | G06N 20/00 |
| 2020/0151591 A1* | 5/2020 | Li | G06N 5/04 |

OTHER PUBLICATIONS

W. Cui et al., "Text-to-Viz: Automatic Generation of Infographics from Proportion-Related Natural Language Statements," IEEE (Year: 2019).*

* cited by examiner

*Primary Examiner* — Stephen S Hong
*Assistant Examiner* — Nicholas Hasty
(74) *Attorney, Agent, or Firm* — Christopher J. Volkmann; Kelly, Holt & Christenson, PLLC

(57) ABSTRACT

A textual user input is received and a plurality of different text-to-content models are run on the textual user input. A selection system attempts to identify a suggested content item, based upon the outputs of the text-to-content models. The selection system first attempts to generate a completed suggestion based on outputs from a single text-to-content model. It then attempts to mix the outputs of the text-to-content models to obtain a completed content suggestion.

20 Claims, 15 Drawing Sheets

MACHINE LEARNING MODEL-BASED CONTENT PROCESSING FRAMEWORK

BACKGROUND

There are a wide variety of different types of computing systems. Some such computing systems include content creation systems, such as slide presentation systems, word processing systems, spreadsheet generation systems, among others.

These types of computing systems can be offered in a client/server architecture, in which a client component accesses a service during the content creation process. Similarly, these types of computing systems can be provided as standalone applications, or in other architectures.

It is not uncommon for a user who is creating content to incorporate design features. For instance, it may be that a user who is creating textual content may wish to incorporate various design elements into the content, such as graphical elements.

The discussion above is merely provided for general background information and is not intended to be used as an aid in determining the scope of the claimed subject matter.

SUMMARY

A textual user input is received and a plurality of different text-to-content models are run on the textual user input. A selection system attempts to identify a suggested content item, based upon the outputs of the text-to-content models. The selection system first attempts to generate a completed suggestion based on outputs from a single text-to-content model. It then attempts to mix the outputs of the text-to-content models to obtain a completed content suggestion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for users who are creating content documents (such as slide presentations) to insert design elements (such as images, emojis, icons, etc.) into the slides, along with text. It can be cumbersome and time consuming for users to locate and insert these design elements. Similarly, it can take excess network bandwidth in that the users may need to search for the design elements, somehow capture them in memory, and then insert them into the content document they are creating (e.g., into the slides that they are creating in the slide presentation system).

The present description thus proceeds with respect to a system that can run in the background of a content creation application. It illustratively analyzes textual inputs provided by a user, using machine learned text-to-content models, such as classifiers, that are trained to generate suggested content based on a textual input. The suggested content can be design elements, such as icons, emojis, images, or other design elements. In some examples, a certain class of textual inputs (such as bullet points) are analyzed and content is suggested for each bullet point. If a single model (such as a text-to-icon model) cannot provide a complete suggestion for all bullet points, then the output of different models can be mixed, based on mixing constraints.

The suggestions can be surfaced for user interaction. The user interactions (e.g., a user dismissing the suggestion or accepting the suggestion, for example) are captured and used for further machine learning to improve the model performance.

Figure 1:
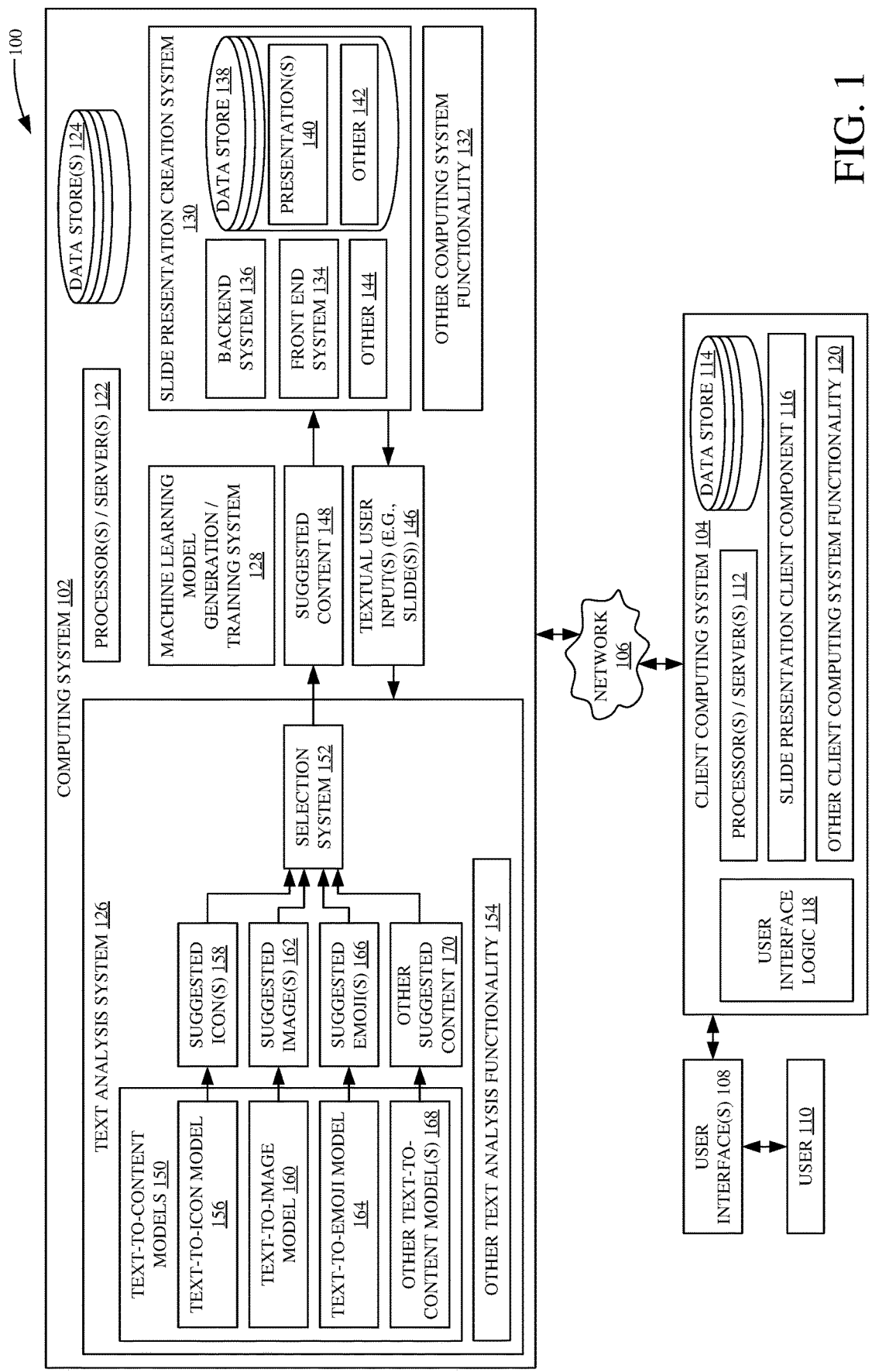
FIG. 1 is a block diagram of one example of a computing system architecture.

FIG. 1 is a block diagram of one example of a computing system architecture 100. Architecture 100 illustratively includes computing system 102 that can be accessed by a client computing system 104 over network 106. Network 106 can thus be any of a wide variety of different types of networks such as a wide area network, a local area network, a near field communication network, a cellular communication network, or any of a wide variety of other networks or combinations of networks.

Client computing system 104 is shown generating user interfaces 108 for interaction by user 110. User 110 illustratively interacts with interfaces 108 in order to control and manipulate client computing system 104 and certain parts of computing system 102.

In one example, client computing system 104 is used by user 110 in order to access a content creation application hosted by computing system 102. User 110 thus uses client computing system 104 to access the content creation application in order to create a content document. The present description will proceed with respect to the content document being a slide presentation. However, it will be appreciated that other content creation systems, such as word processing systems, spreadsheet systems, etc., can be used as well, to create other content documents. Before describing the overall operation of architecture 100 in more detail, a brief description of some of the items in architecture 100, and their operation, will first be provided.

In the example shown in FIG. 1, client computing system 104 illustratively includes one or more processors or servers 112, data store 114, slide presentation client component 116, user interface logic 118, and it can include a wide variety of other client computing system functionality 120. User interface logic 118 illustratively generates user interfaces 108 and detects user interactions with those interfaces. It can provide an indication of the user interactions to other items in client computing system 104 and/or computing system 102.

Slide presentation client component 116 is illustratively a client component of the slide presentation application that is hosted by computing system 102. Therefore, it is configured to communicate with that service or application to allow user 110 to generate a slide presentation.

Computing system 102 illustratively includes one or more processors or servers 122, data store 124, text analysis system 126, machine learning model generation/training system 128, slide presentation creation system 130, and it can include a wide variety of other computing system functionality 132. Slide presentation creation system 130 can, for instance, be a slide presentation application that is hosted by computing system 102. It can include front end system 134, back end system 136, data store 138 (which can store slide presentations 140 that are created by clients), and other items 142. Slide presentation creation system 130 can also include other items 144.

Front end system 134 illustratively exposes an interface that can be accessed by the slide presentation client component 116 over network 106. The interface can be called to perform actions such as to create slides, to provide textual input for slides, to modify, and delete slides, among other things. Back end system 136 illustratively interacts with data store 138 to carry out those actions.

In one example, text analysis system 126 is part of a design system that runs in the background of slide presentation creation system 130, and analyzes inputs from user 110 to generate design outputs that can be used by user 110 to improve the overall design of the slide presentation 140 being created by user 110. In one example, textual user inputs (e.g., slides or the content of slides) 146 are provided to text analysis system 126. Text analysis system 126 analyzes the textual user inputs 146 and provides suggested content 148, based upon the textual user inputs. The suggested content may include design elements or graphical elements corresponding to the textual inputs. For instance, if one of the textual inputs is "car", then the suggested content 148 may illustratively be a graphical element depicting a car, such as an icon, an emoji, an image, etc. Also, in one example, the textual user inputs 146 can be a subset (or specific type) of the text on the slides being created by user 110. For instance, they may be bullet points, titles, or other sections or parts of the slides.

In order to perform the text analysis, system 126 illustratively includes a set of text-to-content models 150, selection system 152, and it can include other text analysis functionality 154. The text-to-content models 150 can be any models (e.g., classifiers) that receive a textual input and provide an item of suggested content based upon the textual input. For instance, models 150 can include text-to-icon model 156 that receives a textual input and provides a suggested icon 158 corresponding to that textual input. Models 150 can also include text-to-image model 160 that receives a textual input and provides a suggested image 162 corresponding to that textual input. Models 150 can also include text-to-emoji model 164 that receives a textual input and provides a suggested emoji 166 corresponding to that textual input. Models 150 can also include other text-to content models 168 which can receives a textual input and provide other suggested content 170, based upon the textual input.

In one example, the various text-to-content models 150 can be categorized based on their lifecycle state. For instance, when they are initially being generated, they can be identified as "developmental" models. However, after they have been generated and iteratively improved, so that their performance stabilizes, they can be identified as "stable" models. They can be identified as falling into other categories in their lifecycle as well.

In addition, the text-to-content models 150 can be evaluated in terms of their quality and data coverage, and ranked based on that evaluation. This is described in greater detail below.

Each of the text-to-content models 150 is also illustratively an "N+1" model. This means that each of the models illustratively outputs the top N items of suggested content, given a textual input, as well as an overall confidence score or confidence metric that is indicative of how confident the model is in the suggested content that it has output. Therefore, in making a selection to output suggested content 148, selection system 152 illustratively evaluates the different items of suggested content 158, 162, 166 and 170, based upon the confidence scores output by the corresponding models, and based upon the rank order of the models given their rank metrics that are generated in terms of the model's quality and coverage. The selection can also consider how consistent the suggested content output by each model is, relative to other slides. The selection steps performed by selection system 152 are also described in greater detail below.

It may be that new sets of content (such as new set of icons, new sets of images, or new sets of emojis, or other completely new sets of content) may be received by computing system 102. Machine learning model generation/training system 128 illustratively generates and trains models based upon those new sets of content. As is described in greater detail below, the new sets of content can be added to already-existing models, or new models can be trained based on the new sets of content. The new models can be merged with already-existing models, or they can be new models placed into production.

Further, as the various text-to-content models 150 are used, machine learning model generation/training system 128 can detect user interactions with the suggested content 148 that is output by text analysis system 126. It can, for instance, detect whether user 110 accepts the suggested content for use in his or her presentation, or rejects the content. This information can be used to further enhance the performance of the text-to-content models 150 as well. This is also described in greater detail below.

Figure 2:
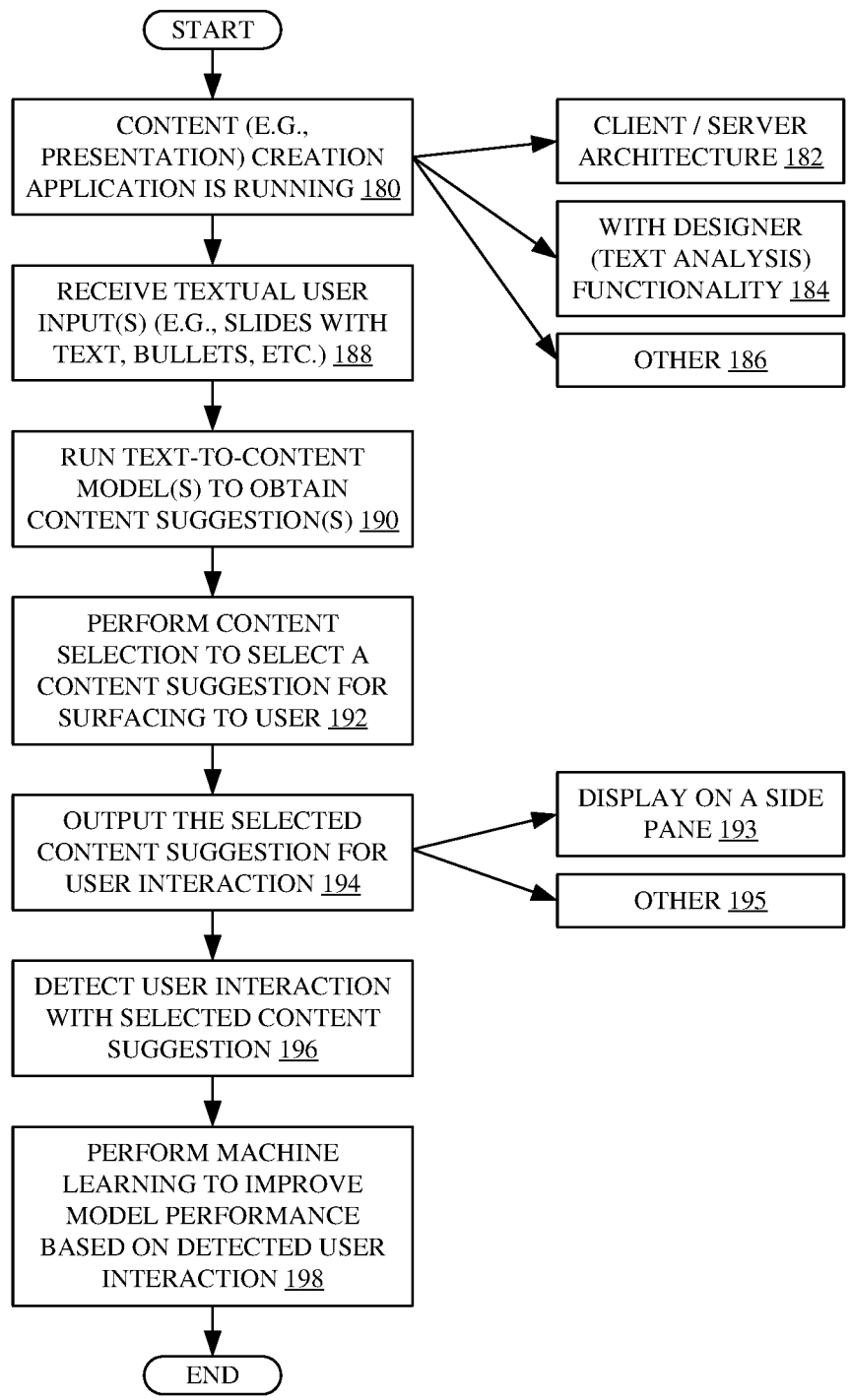
FIG. 2 is a flow diagram illustrating one example of the operation of the architecture illustrated in FIG. 1, in running text-to-content models and performing machine learning to improve model performance.

FIG. 2 is a flow diagram illustrating one example of the overall operation of architecture 100 in receiving a textual user input 146 (such as bullet points on a slide in a presentation 140) and providing suggested content 148 to user 110 and then detecting the user interactions with that content and performing additional machine learning based on the user interactions. It is first assumed that the content creation application (such as a slide presentation application) is running. This is indicated by block 180 in the flow diagram of FIG. 2. The application can be running in a client server architecture 182. It can be running with designer functionality (e.g., text analysis system 126) running in the background or otherwise. This is indicated by block 184. The application can be running in other ways as well, and this is indicated by block 186.

At some point, the slide presentation creation system 130 receives a textual user input which, in accordance with one example, represents text that will appear on a slide in a presentation 140 being generated by user 110. It may be a particular portion of the slide (such as the bullet points, slide headings, slide titles, different parts of an outline, etc.). Receiving the textual user inputs is indicated by block 188. The textual user inputs 146 are then provided to text analysis system 126. System 126 runs the text-to-content models 150 on the textual user inputs, in order to obtain content suggestions 158, 162, 166 and 170. Running the text-to-content models 150 is indicated by block 190 in the flow diagram of FIG. 2.

Selection system 152 then performs content selection to select an item of suggested content (or content suggestion) 148 for surfacing to user 110. This is indicated by block 192. The selected content suggestion 148 is then output for interaction by user 110. This is indicated by block 194. An indication of the selected content suggestion 148 can be output, for instance, so that it can be displayed as a suggestion on a side pane of the user interface display being used by user 110 to author or view the slide presentation. This is indicated by block 193. It can be output for user interaction in a wide variety of other ways as well, and this is indicated by block 195. The user interactions with the content suggestion can take different forms. For instance, the suggested content 148 may be accepted by user 110, dismissed by user 110, modified by user 110, etc.

Machine learning model generation/training system 128 then detects the user interaction with the selected content suggestion 148. This is indicated by block 196 in the flow diagram of FIG. 2. System 128 then performs machine learning to improve model performance based upon the detected interaction. This is indicated by block 198 in FIG. 2.

Figure 3:
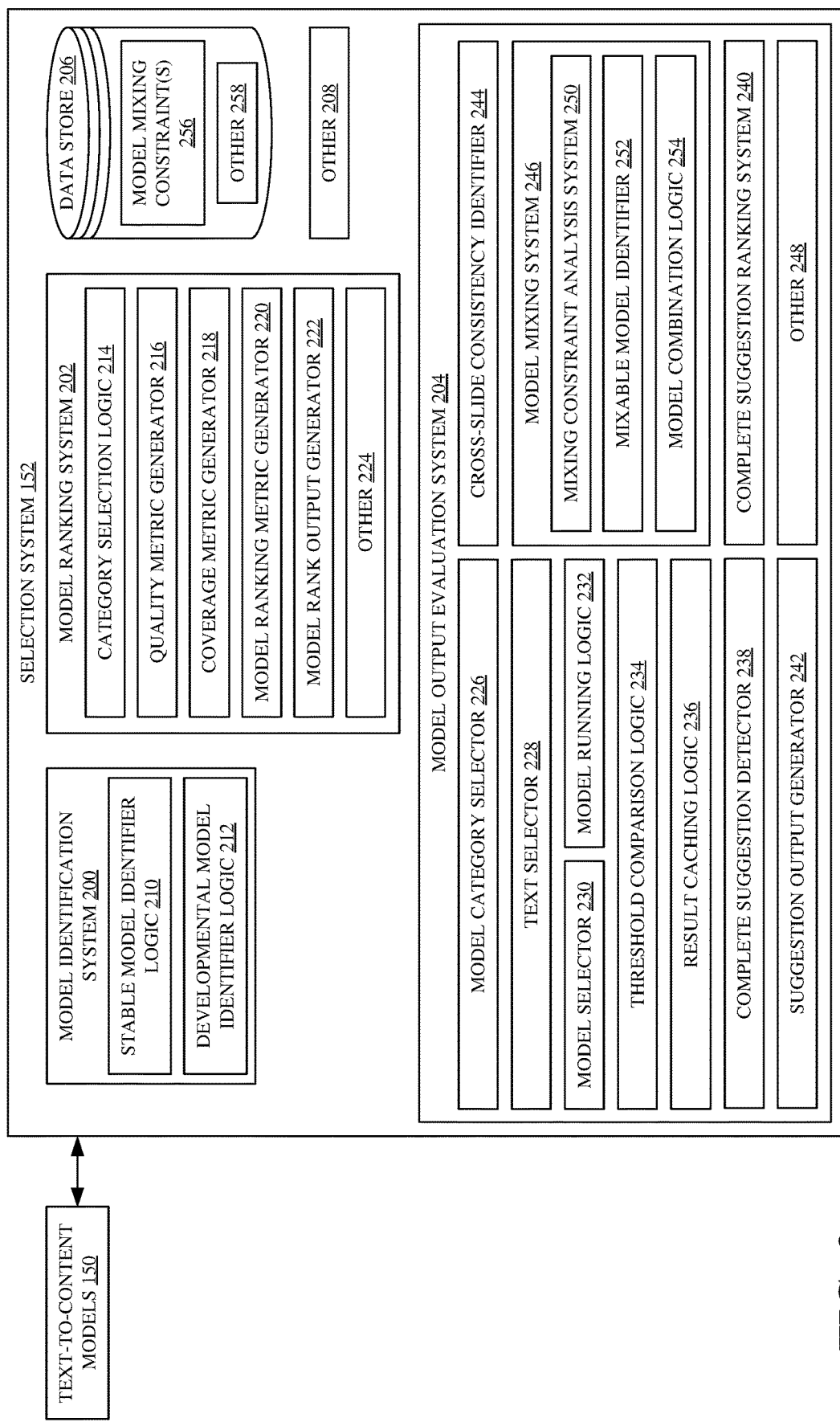
FIG. 3 is a block diagram showing one example of a selection system, in more detail.
Figure 4A:
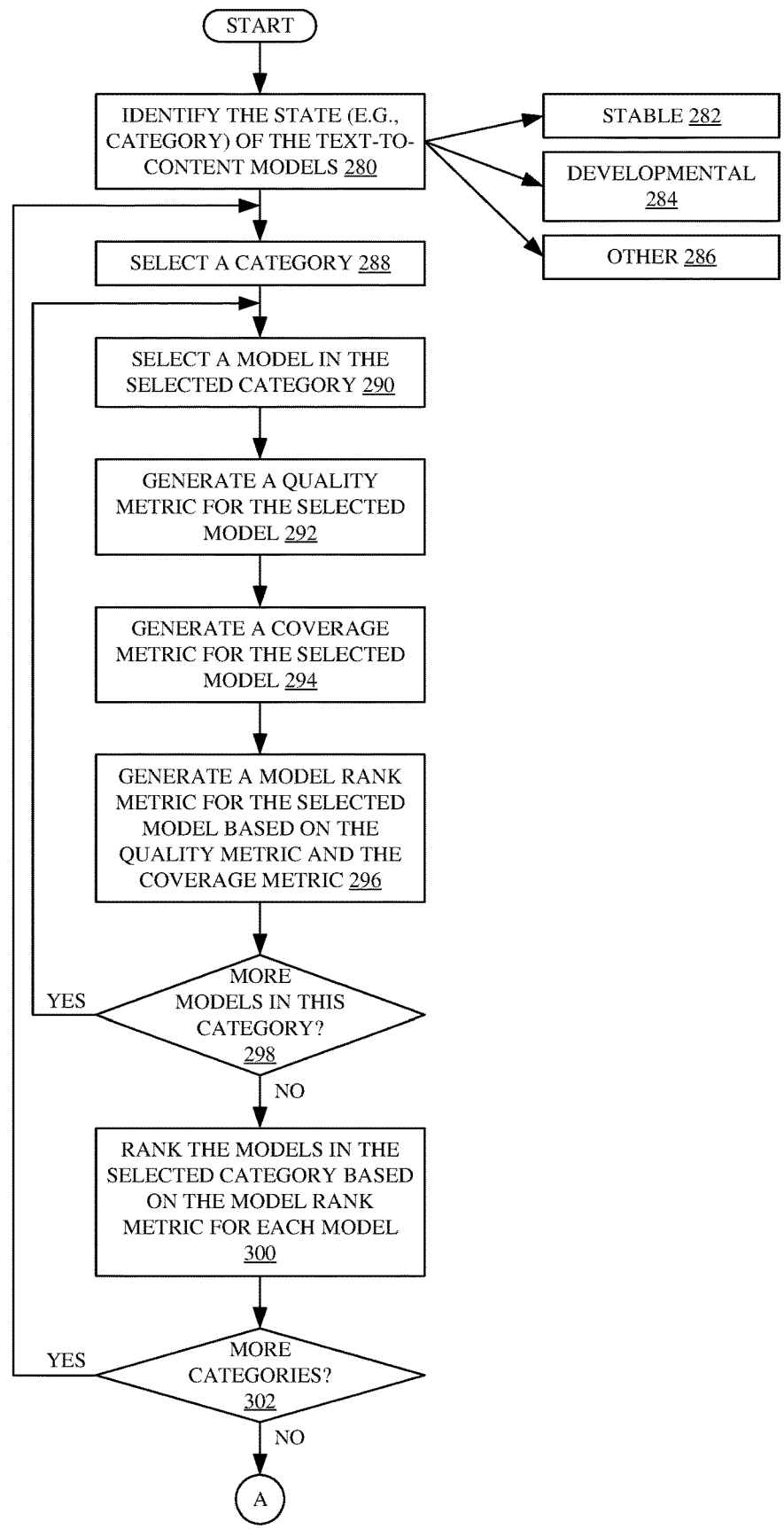
FIGS. 4A-4D (collectively referred to herein as FIG. 4) show a flow diagram illustrating one example of the operation of the selection system illustrated in FIG. 3.
Figure 4B:
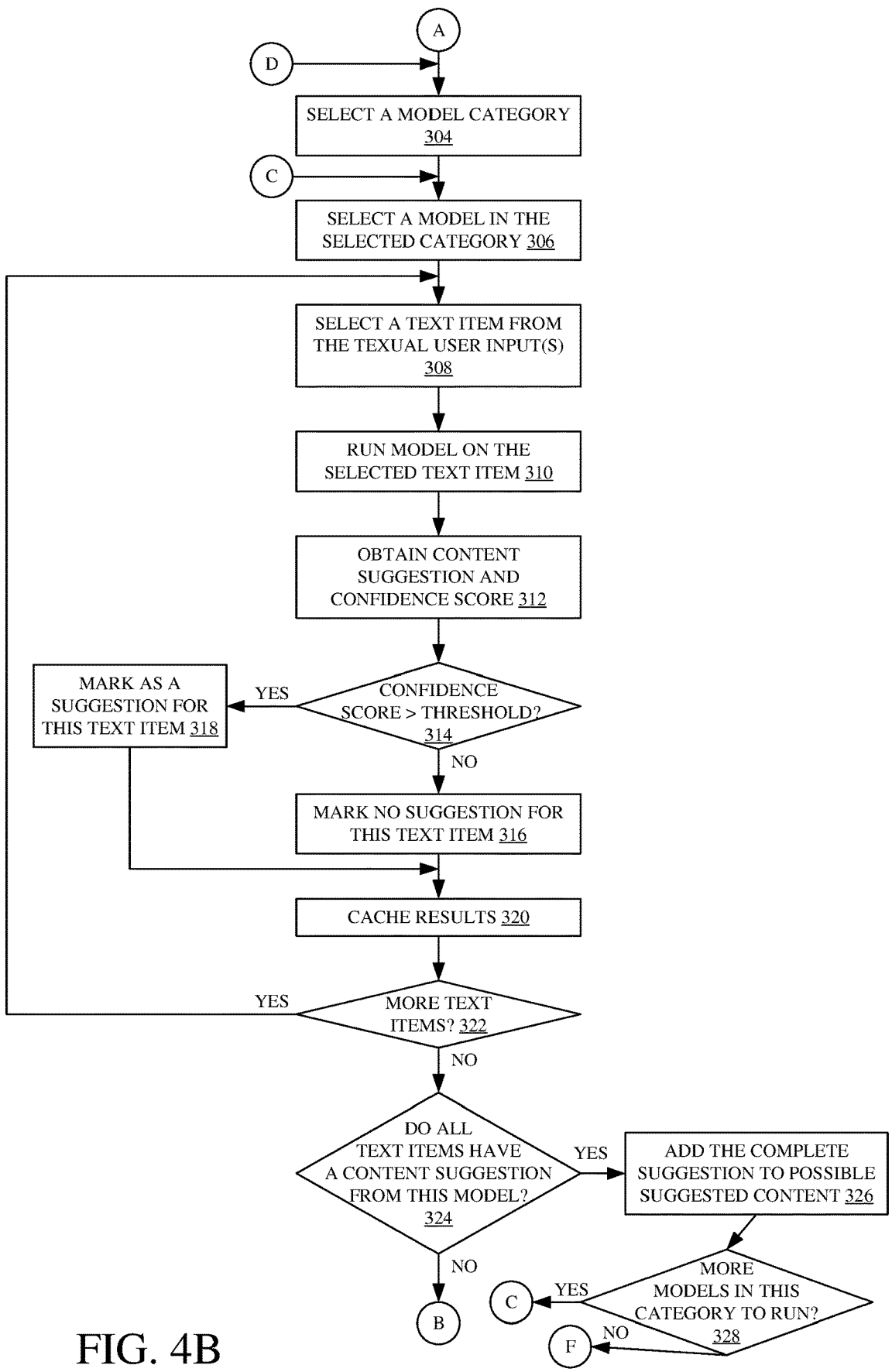
Figure 4C:
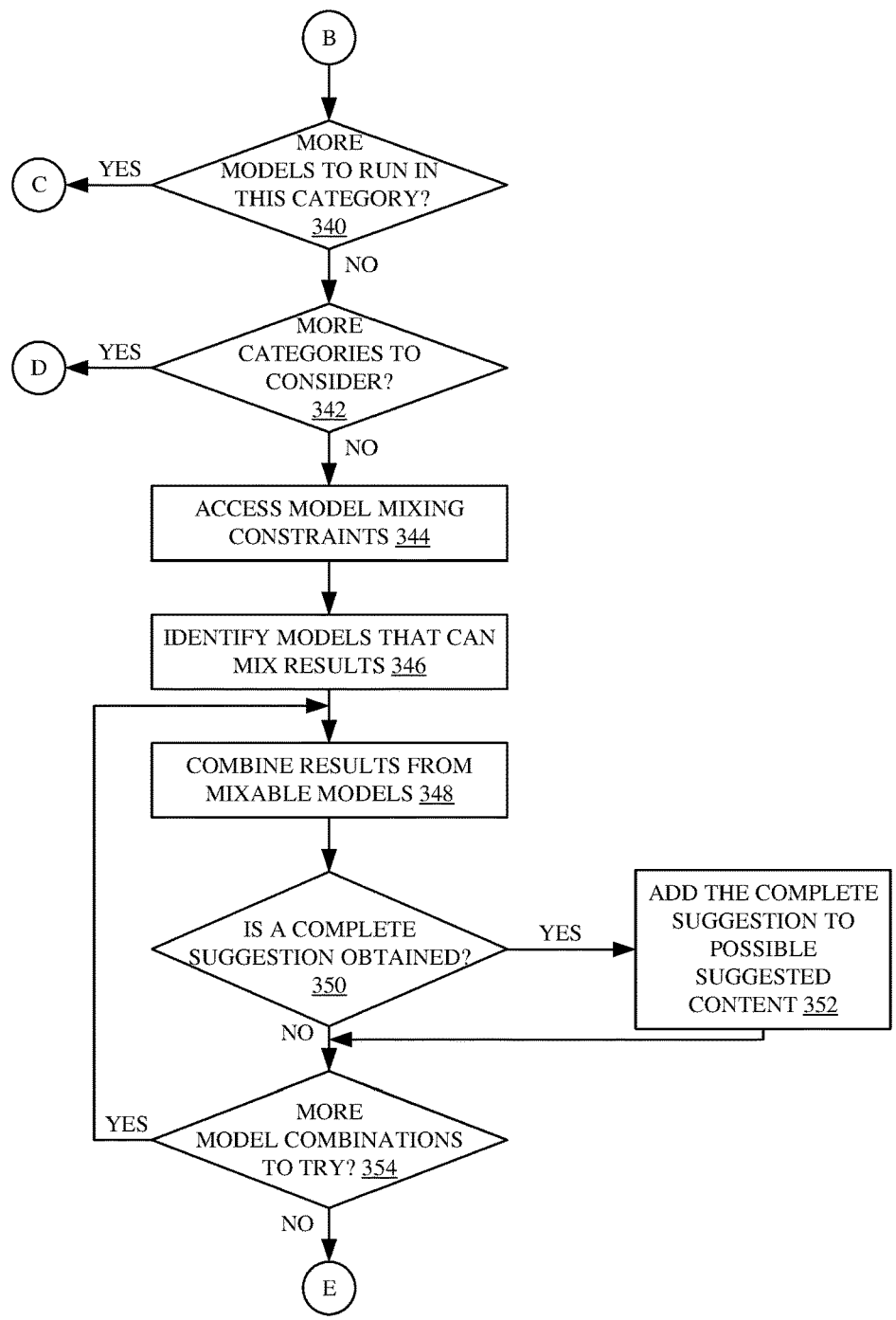
Figure 4D:
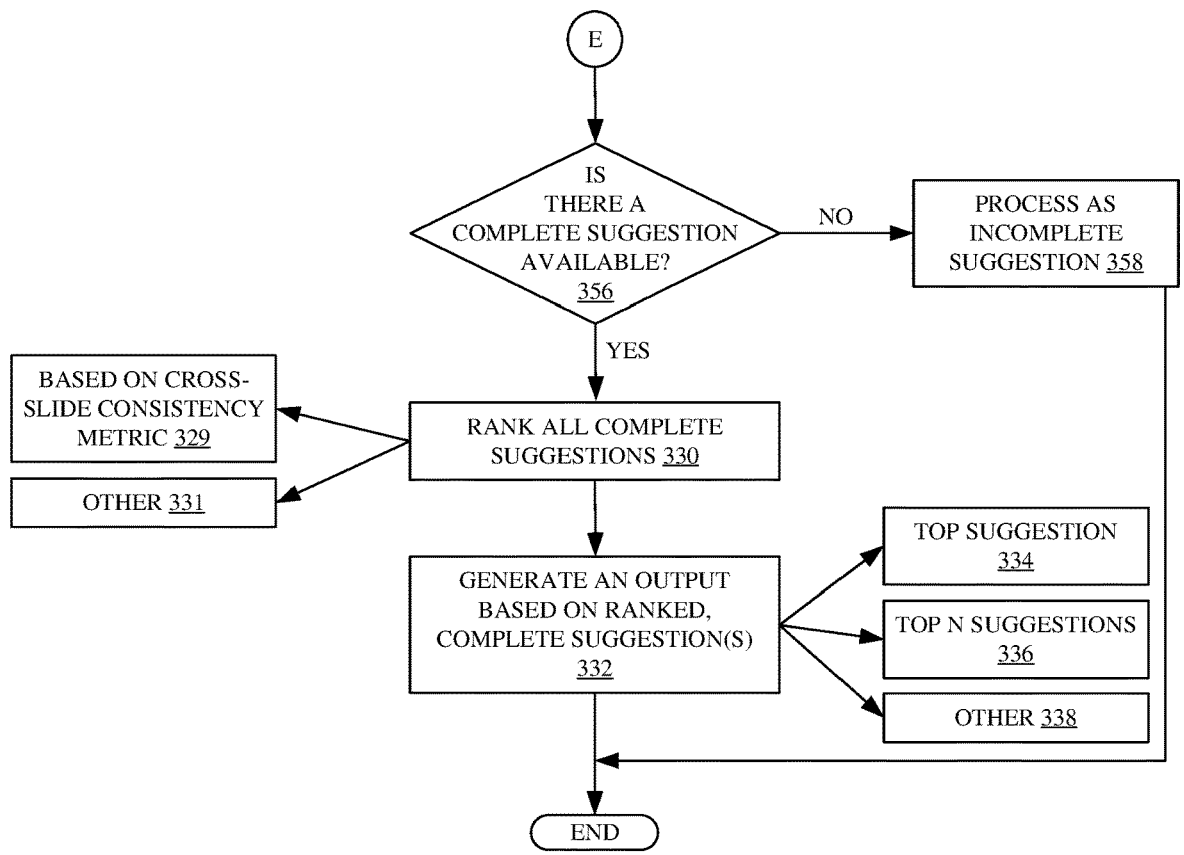

FIG. 3 is a block diagram showing one example of selection system 152, in more detail. FIG. 3 shows that selection system 152 can receive outputs from the text-to-content models 150.

In the example shown in FIG. 3, selection system 152 illustratively includes model identification system 200, mode ranking system 202, model output evaluation system 204, data store 206, and it can include other items 208. Model identification system 200 can include stable model identifier logic 210 and developmental model identifier logic 212. Model ranking system 202 can include category selection logic 214, quality metric generator 216, coverage metric generator 218, model ranking metric generator 220, and model rank output generator 222. It can include other items 224 as well.

Model output evaluation system 204 can include model category selector 226, text selector 228, model selector 230, model running logic 232, threshold comparison logic 234, result caching logic 236, complete suggestion detector 238, complete suggestion ranking system 240, suggestion output generator 242, cross-slide consistency identifier 244, model mixing system 246, and it can include other items 248. Model mixing system 246 can include mixing constraint analysis system 250, mixable model identifier 252, and model combination logic 254.

Data store 206 can include model mixing constraints 256, and it can include other items 258. Before describing the overall operation of selection system 152 in more detail, a brief description of some of the items in selection system 152, and their operation will first be provided.

Model identification system 200 identifies the lifecycle state of the different text-to-content models 150. This will be used when selection system 152 performs its selection. For instance, it may preferentially use suggested content 148 that is generated by a stable model as opposed to one that is generated by a model that is still in its developmental state. Therefore, stable model identifier logic 210 identifies whether the model is stable, and developmental model identifier logic 212 identifies whether it is still in its developmental state.

Model ranking system 202 is used by selection system 152 to rank the text-to-content models 150. In one example, this is done based on the quality and data coverage of the different models. Also, model ranking system 202 illustratively ranks the models 150 in each of the categories (e.g., it ranks the stable models relative to one another, and it ranks the developmental models relative to one another). Therefore, model ranking system 202 includes category selection logic 214 that selects a category of models to rank. Quality metric generator 216 generates a quality metric corresponding to each of the models in the selected category, and coverage metric generator 218 generates a coverage metric for each of the models in the selected category.

For instance, quality metric generator 216 may generate a higher quality metric corresponding to a model if the performance of the model is higher, such as where it has been trained with more production data by machine model generation/training system 128. Coverage metric generator 218 illustratively generates a coverage metric indicative of how broadly the particular model covers textual inputs. By way of example, the coverage metric may be generated based on an amount of different textual inputs that have been seen by the model, and for which suggested content has been provided, relative to the amount of that suggested content that has been kept by the users. If the model has seen a large variety of different textual inputs and it has generated suggested content for those textual inputs that have been kept by the users at a relatively high rate, then the coverage metric for the corresponding model will illustratively be relatively high. However, if the model has seen a relatively low diversity of textual inputs and/or the suggested content has been rejected by the user at a relatively high rate, then the coverage metric for the corresponding model may be relatively low.

Model ranking metric generator 220 illustratively generates an overall metric, based upon the quality metric and the coverage metric, that can be used to rank the models relative to one another. This may be done by normalizing the quality and coverage metrics and combining them, or by combining them and using the combination as a ranking metric in other ways.

Model ranking output generator 222 illustratively generates an output indicative of a ranking of the models, in each category (e.g., the stable models relative to one another and the developmental models relative to one another) based upon the model ranking metric.

Model output evaluation system 204 uses the lifecycle state of the model (as identified by model identification system 200) and the model ranking (as provided by model ranking system 202), as well as the confidence metrics provided by the models themselves, to evaluate the different items of suggested content 158, 162, 166 and 170, provided by the models 150. It does this evaluation in order to select one as the suggested content 148 that is provided for surfacing to user 110.

In doing so, model output evaluation system 204 first attempts to obtain a complete suggestion from a single stable model. A complete suggestion is an output from a single model that covers all of the textual inputs under analysis. For instance, where the textual inputs under analysis are the bullet points from a slide, a complete suggestion is a single item of suggested content 148 for each of the textual bullet points for that slide, from one model. If a single output is not able to be obtained from a stable model, then model output evaluation system 204 attempts to obtain a single output from a developmental model. If that is not able to be obtained, then model output evaluation system 204 attempts to obtain a completed suggestion by mixing the outputs from two or more different models. In doing so, system 204 applies model mixing constraints 256. These constraints may be rules or other mappings that indicate which of the different text-to-content models 150 can have outputs that are mixed with one another.

By way of example, it may be that different text-to-content models 150 provide outputs in very different forms, or in designs or styles that are very different from one another. However, it may be that different models 150 provide outputs in displays or styles that are very similar to one another. In one example, then, the model mixing constraints 256 may indicate that model outputs from models that output very different designs or styles are not to be mixed with one another, while the outputs of models that provide outputs of similar designs or styles can be mixed with one another.

Also, in evaluating the suggested content 158, 162, 166 and 170, system 204 can consider cross-slide consistency. By way of example, it may be that multiple slides that have occurred previously in the slide presentation (or that occur after the slide under analysis) have content that is of a certain type or style or design. That may be considered in suggesting an output for the text in the slide under analysis. One or more consisting characteristics can be identified for the other slides and used to evaluate which items of suggested content 158, 162, 166 and 170 are most consistent. For instance, it may be that all of the previous slides have content that is in the form of icons. It may thus be that system 204 will preferentially select suggested content for the current slide that is also in the form of icons, over suggested content that is in the form of, for example, images. These are examples only.

To describe evaluation and selection of suggested content, in one example, more specifically, model category selector 226 selects a model category (e.g., the stable category, the developmental category, etc.) of models to be run. Text selector 228 then selects text items that are to be analyzed using those models. Model selector 230 selects one of the models in the selected category and model running logic 232 runs that model on the selected text. Threshold comparison logic 234 compares the confidence metric output by the model, to a threshold confidence level, to determine whether the output of the model meets the confidence threshold. This continues for all of the text items in the text under analysis. The results of running the model are stored in a cache by result caching logic 236.

Complete suggestion detector 238 determines whether the selected model has output a complete suggestion (one which provides suggested content for all of the text items—e.g., bullet points—under analysis). Complete suggestion ranking system 250 ranks the complete suggestions that are output by the different models (if any are output) and suggestion output generator 242 selects and generates the suggested content 148 for the textual input received.

Again, cross-slide consistency identifier 244 may identify a characteristic, such design elements (e.g., the design or style of the content used on other slides) in determining which particular item of suggested content will be selected.

When complete suggestion detector 238 determines that none of the models have generated a complete suggestion, then model mixing system 246 mixes the model outputs, in an attempt to obtain a complete suggestion. Mixing constraint analysis system 250 accesses the model mixing constraints 256 to determine which models can have their outputs mixed with one another to obtain a completed suggestion. Mixable model identifier 252 identifies those models and model combination logic 254 identifies the outputs from different combinations of models that can be used to obtain a completed result. Those completed results can then be ranked by complete suggestion ranking system 240 so that suggestion output generator 242 can select and generate the suggested content 148 based upon the outputs from a combination of different models.

FIGS. 4A, 4B, 4C and 4D (collectively referred to herein as FIG. 4) show a flow diagram illustrating one example of the operation of architecture 100, and specifically selection system 152, in receiving a textual input and generating suggested content 148 based on that textual input, using a plurality of different text-to-content models 150.

Model identification system 200 first identifies which lifecycle category the different models are in. It thus identifies the lifecycle state of the text-to-content models 150. This is indicated by block 280 in the flow diagram of FIG. 4. The models can be in a stable category 282, in a developmental category 284, or any of a wide variety of other categories 286.

Model ranking system 202 then ranks the models based upon quality and coverage. Category selection logic 214 first selects a category (e.g., the stable category, the developmental category, etc.). This is indicated by block 288. Model ranking system 202 then selects a model within the selected category. For instance, it may be that text-to-icon model 156 and text-to-image model 166 are both in the stable category. System 202 thus selects the text-to-icon model 156 for further analysis. Selecting a model in the selected category is indicated by block 290 in the flow diagram of FIG. 4. Quality metric generator 216 generates a quality metric for the selected model. This is indicated by block 292. Coverage metric generator 218 generates a coverage metric for the selected model, as indicated by block 294. Model ranking metric generator 220 generates a model rank metric that can be used to rank the current model, relative to other models in the same category, based upon the quality metric and the coverage metric. This is indicated by block 296. It is determined whether more models exist in this category, for which a rank metric is to be generated. This is indicated by block 298. If so, processing reverts to block 290 where the next model in the selected category is selected and a rank metric is generated for that model.

Once a rank metric is generated for all of the models 150 in the selected category, then model rank output generator 222 ranks the models in the selected category, based upon the model rank metric. This is indicated by block 300.

Model ranking system 202 then proceeds to rank all of the models in the next category (if there are any). For instance, assume that text-to-emoji model 164 and other text-to-content model 168 are in the developmental category. If that is the case, as indicated by block 302, then processing reverts to block 288 where the developmental category is selected, and the models within that category are ranked relative to one another, based on quality and coverage, as described above.

Once all of the models in the different categories are ranked relative to one another, then the textual input can be processed in order to generate suggested content 148 for the textual user input 146. To do this, model category selector 266, in model output evaluation system 204, selects a model category. This is indicated by block 304. For instance, it may select the stable category, or the developmental category.

Model selector 230 then selects one of the models in the selected category. This is indicated by block 306. For instance, where the stable category is selected, model selector 300 may select text-to-icon model 156.

Text selector 228 then selects an item of text to be analyzed (or classified) by the model. Selecting a text item from the textual user inputs is indicated by block 308 in the flow diagram of FIG. 4. For example, assume that the textual user input is a set of bullet points that appear on a slide. In that case, the first bullet point may be selected for analysis (e.g., classification) by the text-to-content models 150.

Model running logic 232 then runs the selected model on the selected text item (e.g., on the selected bullet point). This is indicated by block 310. The model outputs a content suggestion, and a confidence score, for that content suggestion. This is indicated by block 312. Threshold comparison logic 234 determines whether the confidence score is above a threshold level. This is indicated by block 314. If not, then threshold comparison logic 234 marks the selected text item as having no suggestion from the current model. This is indicated by block 316. However, if the model does output a suggestion that has a confidence level that exceeds the threshold level, then threshold comparison logic 234 marks the model output as a positive content suggestion for this text item. This is indicated by block 318. Either way (whether the content suggestion is output as a content suggestion for the text item, or whether no suggestion is output) the results can be cached by result caching logic 236. This is indicated by block 320.

If there are more textual inputs to be processed, as indicated by block 322 (e.g., if there are more bullet points that need to have content suggested for them), then processing reverts to block 308 where a next text item is selected and where the selected model is run on that text item.

However, once all of the text items (e.g., all of the bullet points under analysis) have been processed using the selected model, the complete suggestion detector 238 determines whether the model has generated a complete suggestion for the textual inputs under analysis. For instance, it determines whether there is an acceptable item of suggested content for each of the bullet points. This is indicated by block 324 in the flow diagram of FIG. 4. If so, then the complete suggestion is added to a list of possible suggested content, as indicated by block 326.

Complete suggestion detector 238 then determines whether there are more models in the selected category to run on the textual inputs. This is indicated by block 328. If so, processing reverts to block 306 where a next text-to-content model, in the selected category, is selected and run on the set of user inputs (e.g., on the set of bullet points). If there are no more models in the selected category to run, then at block 328, this means that at least one complete suggestion has been generated by at least one model in the selected category, and processing proceeds at block 330. Where complete suggestion ranking system 240 ranks all of the complete suggestions that have been obtained. They can be ranked based on the model rank and/or category of the model that generated the suggestions or based on the confidence score. At block 330, the complete suggestions can also be ranked based on a cross-slide consistency metric generated by cross-slide consistency identifier 244. For instance, where numerous other slides include icons, then cross-slide consistency identifier 244 may generate a relatively high ranking metric for the complete suggestions that include icons. However, where the other slides have consistently used images, then cross-slide consistency identifier 244 may generate a cross-slide consistency metric that is relatively low, for complete suggestions that include icons. Ranking the complete suggestions based on a cross-slide consistency metric is indicated by block 329. It can be done based on a wide variety of other criteria as well. This is indicated by block 331.

Suggestion output generator 242 generates an output based upon the ranked, complete suggestions. This is indicated by block 332. The output can be only the top ranked content suggestion which will be output as suggested content 148. This is indicated by block 334. The output can be the top N ranked suggestions as indicated by block 336. The output can take other forms as well, and this is indicated by block 338.

Returning to block 324, assume next that complete suggestion detector 238 has determined that all of the text items in user inputs under analysis do not have a content suggestion from the current model. This means that no complete suggestion has been obtained using this model. If that is the case, then detector 238 determines whether there are more models in this category to run. This is indicated by block 340 in the flow diagram of FIG. 4. For instance, it may determine that text-to-image model 160 is in the stable category, and has not yet been run on the textual inputs (e.g., on the bullet points). Thus, processing reverts to block 306 where the next model in this category is selected and run on the textual inputs.

If all of the models in the selected category have been run, then model category selector 226 determines whether there are more model categories to consider. For instance, after all of the models in the "stable" category have been run, it then considers whether there are other categories, such as the "developmental" category that have models that are to be run. This is indicated by block 342 in the flow diagram of FIG. 4. If so, processing reverts to block 304 where it selects the next model category so that the models in that category can be run or the textual user inputs.

If there are no more categories to consider, at block 342, then this means that no single model has generated a complete suggestion (e.g., no single model has provided suggested content for all of the bullet points under analysis). Thus, model mixing system 246 then uses mixing constraint analysis system 250 to access the model mixing constraints 256. This is indicated by block 344 in the flow diagram of FIG. 4. Based upon those constraints, mixable model identifier 252 identifies any of the text-to-content models 150 that can have outputs that are mixed together with one another to generate a complete suggestion. Identifying the models that can mix results is indicated by block 346 in the flow diagram of FIG. 4.

Model combination logic 254 then begins combining the results (e.g., from cache) of the mixable models in an attempt to obtain one or more complete suggestions. This is indicated by block 348. Complete suggestion detector 238 determines whether any complete suggestions can be obtained. This is indicated by block 350. If so, then the complete suggestions that have been obtained are added to a list of possible suggested content. This is indicated by block 352.

Mixable model identifier 252 then determines whether there are any other model combinations to try in order to obtain additional complete suggestions. This is indicated by block 354. If so, processing reverts to block 348 where another combination of models is attempted. However, if, at block 354, it is determined that there are no more model combinations to try, then complete suggestion detector 238 generates an output indicating whether there is at least one complete suggestion available, based on the mixed model results. This is indicated by block 356. If not, then the textual input is processed as yielding an incomplete suggestion. This is indicated by block 358. This can take a number of different forms. For instance, an operator output can be generated with a partial suggestion. In another example, an operator message is generated indicating that there are no complete suggestions to display. In yet another example, the side pane where the suggestions are displayed is simply left blank. These and other operations can be performed in response to the system generating no complete suggestions for the textual operator input.

However, if, at block 356, it is determined that there is at least one complete suggestion available, from mixing results, then all of the complete suggestions are ranked as indicated by block 330. An output is generated based on the ranked, complete suggestions, as indicated by block 332, and as is discussed in greater detail above.

Figure 5:
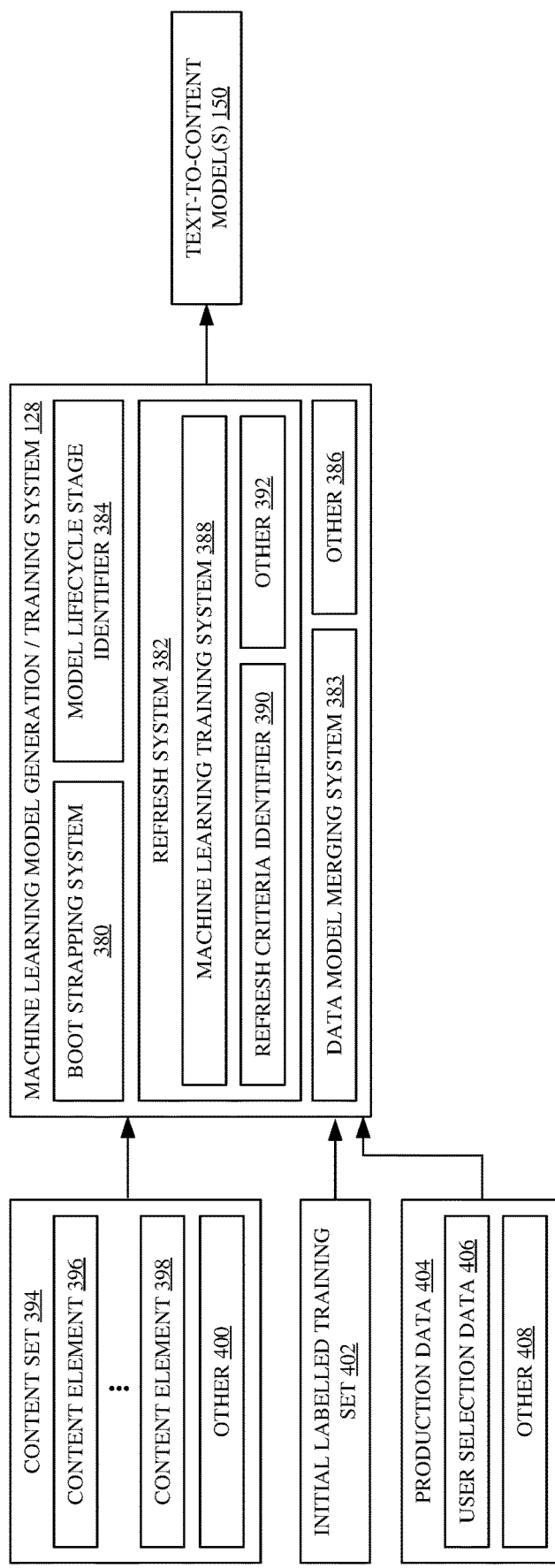
FIG. 5 is a block diagram showing one example of a machine learning model generation/training system in more detail.

FIG. 5 is a block diagram showing one example of machine learning model generation/training system 128 in more detail. In the example shown in FIG. 5, system 128 illustratively includes bootstrapping system 380, refresh system 382, data/model merging system 383, model lifecycle stage identifier 384, and it can include other items 386. Refresh system 382, itself, illustratively includes machine learning training system 388, refresh criteria identifier 390, and it can include other items 392. FIG. 5 also shows that, in one example, machine learning model generation/training system 128 illustratively receives a content set 394 that includes a plurality of different content items 396-398, and it can include other items 400. Each content set 394 illustratively includes a set of content that can be used to train a text-to-content model that will match the content items 396-398 to text. Therefore, content set 394 may include a set of content where the content elements 396-398 include a set of emojis, a set of icons, or a set of images. In that case, machine learning model generation/training system 128 illustratively generates and trains a model that will match text to the content elements 396-398 in content set 394.

FIG. 5 also shows that system 128 can receive an initial, labeled training data set 402, as well as production data 404 which may include user selection data 406 and other items 408. The initial labeled training data set 402 illustratively includes a set of data in which text is matched to content elements in content set 394. This initial set of labeled training data can be used to train a model (e.g., a classifier or other model) that receives textual inputs and generates outputs of suggested content elements corresponding to the textual inputs.

Production data 404 is illustratively actual user data that is received when suggested content is provided by a model to a user. The production data 404 is indicative of how the user responded to, or interacted with, the suggested content. For instance, it may be that the user dismisses the suggested content. That is captured in production data 404. On the other hand, it may be that the user accepts the suggested content. That is also captured by production data 404. The user selection data 406 may identify whether the user selected the suggested content for use in his or her slide presentation, or dismissed it. Thus, production data 404 can be used to iteratively train, and improve, the performance of the various text-to-content models.

Bootstrapping system 380 receives a new content set 394 and some initial labeled training data set 402. It generates a model for the content set. During this process, model lifecycle stage identifier 384 identifies the model as a "developmental" model. When the model is put into production, production data 404 is captured based on the model usage. Refresh system 382 iteratively trains the model to improve its performance. Machine learning training system 388 uses the production data 404 in order to further train, and enhance, the performance of the model. Refresh stability criteria identifier 390 identifies criteria indicating that further refreshment of the model (e.g., further iterative training) will not yield a sufficient improvement in model performance to warrant continued training. Once that occurs, model lifecycle stage identifier 384 identifies the lifecycle stage of the mode as "stable".

Data/model merging system 383 can be used to merge a new content set 394 into an already-existing content set in a model that has already been generated. Also, if a new model is generated, the merging system 383 can merge that model with an already-exiting model that models content of the same type.

Figure 6A:
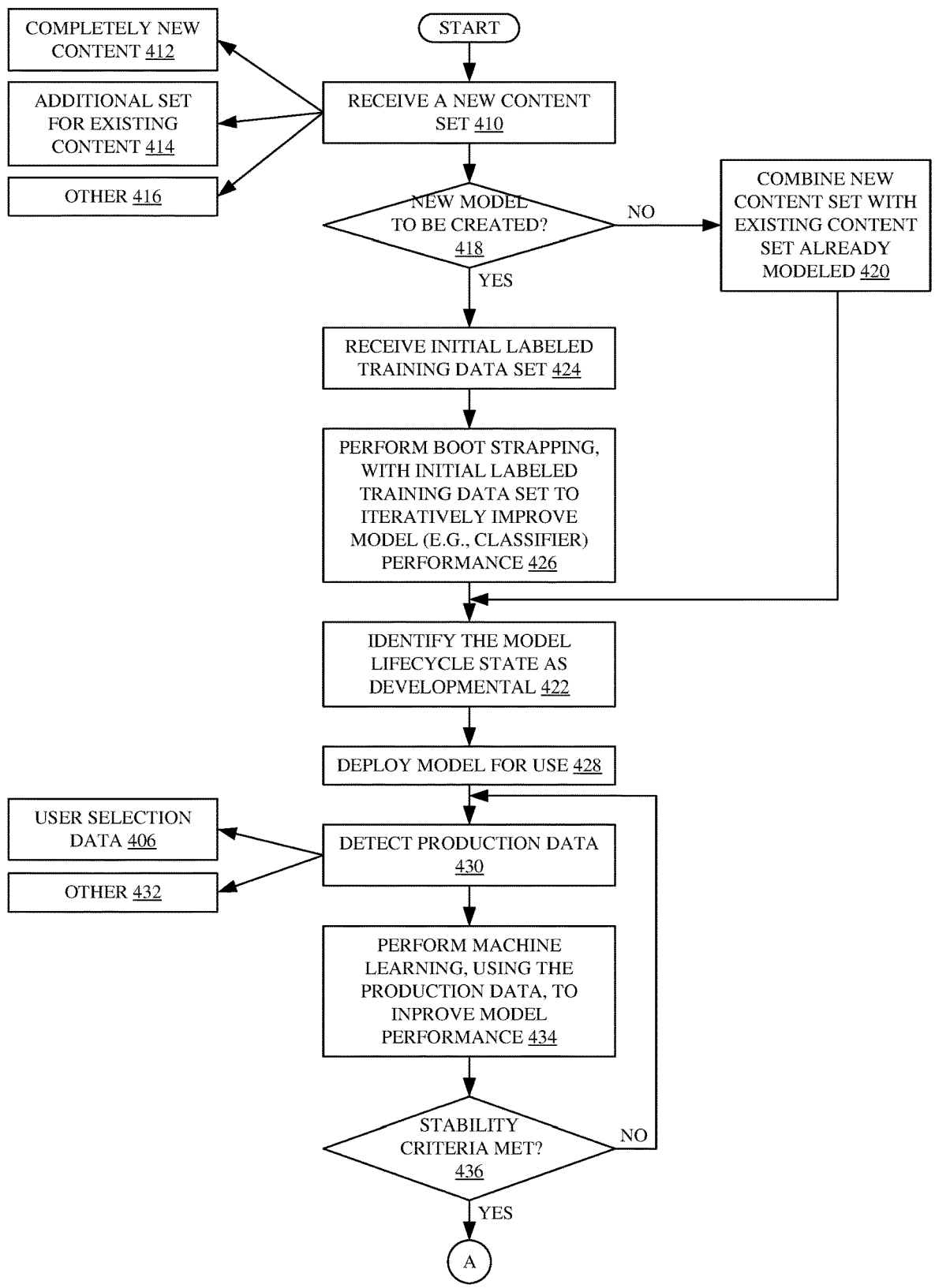
FIGS. 6A and 6B (collectively referred to herein as FIG. 6) show a flow diagram illustrating one example of the operation of the machine learning model generation/training system shown in FIG. 5.
Figure 6B:
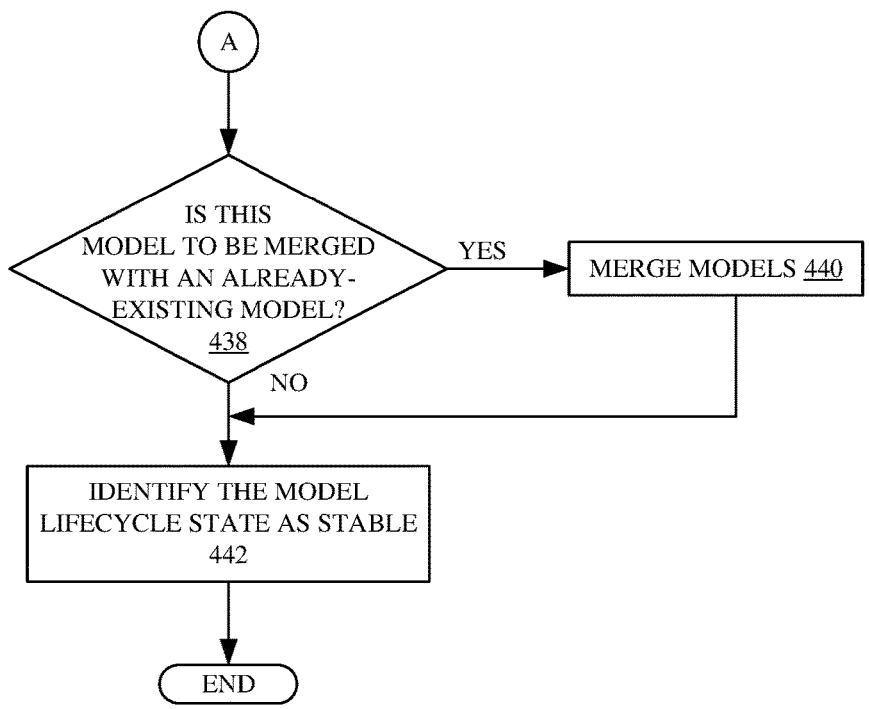

FIGS. 6A and 6B (collectively referred to herein as FIG. 6) show one example of the operation of machine learning model generation/training system 128. System 128 first receives a content set 394. This is indicated by block 410 in the flow diagram of FIG. 6. The content set 394 can be a completely new content set (such as a content set with a new type of content elements 396-398—such as images, icons, emojis, etc.). Receiving a completely new content set is indicated by block 412. The content set can also be an additional content set that adds to existing content. For instance, assume that a text-to-content model has already been generated for icons. The content set may be an additional set of icons, in addition to those for which the text-to-icon model was already generated. Receiving an additional set for existing content is indicated by block 414. The content set can be received in other ways as well, and this is indicated by block 416.

There are a number of different ways to handle a content set that was just received. For instance, if it is a completely new content set, then system 128 will illustratively generate a text-to-content model for that new content set. However, it may be an additional content set that is to be added to a content set, of the same type, that was already received. In that case, either a new model can be created for that additional content set, or the content set can be merged by merging systems 383 into the model that was already created. When it is merged, that model (with the merged data) can be trained, based on production data, to accommodate the new content set. In addition, even if the new content set is an additional set for existing content, a new model can be trained just for that new content set, and then the new model, and the existing model, can be merged by system 383 once they are both stable, or at another time in their lifecycle.

Thus, at block 418, system 128 determines whether a new model is to be created. If not, then system 128 combines the new content set with the existing content set that has already been modeled. In other words, it adds the content set to the model that represented the previous content set (of the same type of content). This is indicated by block 420. Model lifecycle stage identifier 384 then identifies that model (with the new content set just incorporated) as a developmental model so that it can be refreshed, using production data 404, by refresh system 382. Identifying the lifecycle state as developmental is indicated by block 422.

Returning to block 418, if system 128 determines that a new model is to be created based on the content set 394 that it has just received, then bootstrapping system 380 receives the initial labeled training data set 402. This is indicated by block 424 in the flow diagram of FIG. 6. As discussed above, the labeled training data set may map different textual inputs to different content elements 396-398 in content set 394.

Bootstrapping system 380 then uses the initial labeled training data set to perform bootstrapping. This process iteratively improves the model (e.g., classifier) performance, until it is sufficiently trained that it can be used in production. This is indicated by block 426 in the flow diagram of FIG. 6. Once the model has been generated and bootstrapping has been performed to perform the initial training on the model, then, again, model lifecycle stage identifier 384 identifies the lifecycle stage of the model as "developmental".

Once a model has been identified as a developmental model, it can be deployed for use in a production environment. Deploying the model for use is indicated by block 428 in the flow diagram of FIG. 6.

Refresh system 382 either continuously or intermittently detects production data 404 for the developmental model. This is indicated by block 430 in the flow diagram of FIG. 6. In one example, the production data 404 can be captured and stored until a sufficient amount of data has been accumulated, and it can then be transmitted to refresh system 382 (or obtained by refresh system 382) to use for training. In another example, the data can be accumulated and buffered for a pre-defined amount of time before it is sent to refresh system 382, or it can be continuously provided to refresh system 382 for training. The production data 404 illustratively includes the user selection data 406 that indicates how users are interacting with the content suggestions made by the developmental model. The production data can be detected in other ways, and it can include other types of data as well. This is indicated by block 432 in the flow diagram of FIG. 6.

Once production data is obtained, then machine learning training system 388 performs machine learning, using the production data 404, to improve the model performance. This is indicated by block 434 in the flow diagram of FIG. 6. The machine learning program can be any of a wide variety of different types of algorithms that are used to improve model performance (such as classifier performance). In one example, it can include a reinforcement learning agent that learns from production data 404, and automatically adjusts to a preferred policy that enhances model performance. This is just one example.

Machine learning training system 388 continues to iteratively train the new model until refresh stability criteria identifier 390 identifies stability criteria indicating that the model is stable, and no longer needs to be trained. This is indicated by block 436 in the flow diagram of FIG. 6. The stability criteria can include any of a wide variety of criteria. For instance, the stability criteria may consider how much the model performance is improving. Training consumes a certain amount of processing overhead and resources, and therefore an improvement threshold may be set. If the model is not improving sufficiently to meet the improvement threshold, with each iteration, then this may indicate that the model is stable. The stability criteria can be any of a wide variety of other criteria as well.

Once the refresh stability criteria identifier 390 identifies that the stability criteria have been met, then it is determined whether the model is to be merged with an already-existing model. Recall that the content set 394 may be an additional content set that is received in addition to a content set for which a text-to-content model has already been generated. If that is the case, and if the system determines that it is to generate a new model for the additional content set, then once the model is stable, data/model merging system 383 can merge the new model with the already-existing model. Determining whether the model is to be merged with another model is indicated by block 438 in the flow diagram of FIG. 6 and merging the two models is indicated by block 440.

If the model is not to be merged, or once the model is merged with the already-existing model, then model lifecycle stage identifier 384 identifies the resultant model as having a lifecycle state that is stable. This is indicated by block 442 in the flow diagram of FIG. 6.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
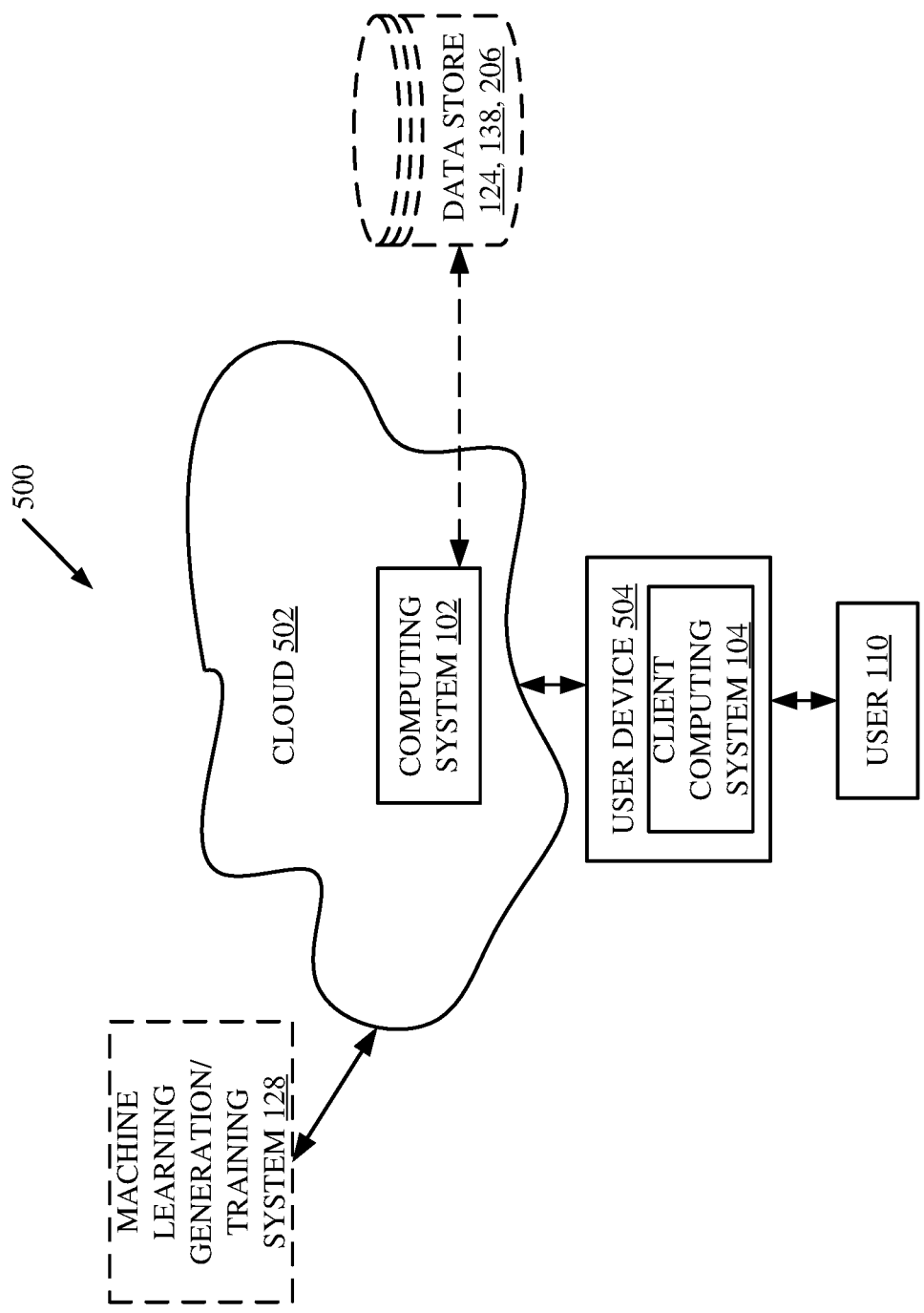
FIG. 7 is a block diagram showing one example of the computing architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that computing system 102 can be located in cloud 502 (which can be public, private, or a combination where portions are public while others are private). Therefore, user 110 uses a user device 504 to access those systems through cloud 502.

FIG. 7 also depicts another example of a cloud architecture. FIG. 7 shows that it is also contemplated that some elements of computing system 102 can be disposed in cloud 502 while others are not. By way of example, data stores 124, 138 and 206 can be disposed outside of cloud 502, and accessed through cloud 502. In another example, machine learning generation/training system 128 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
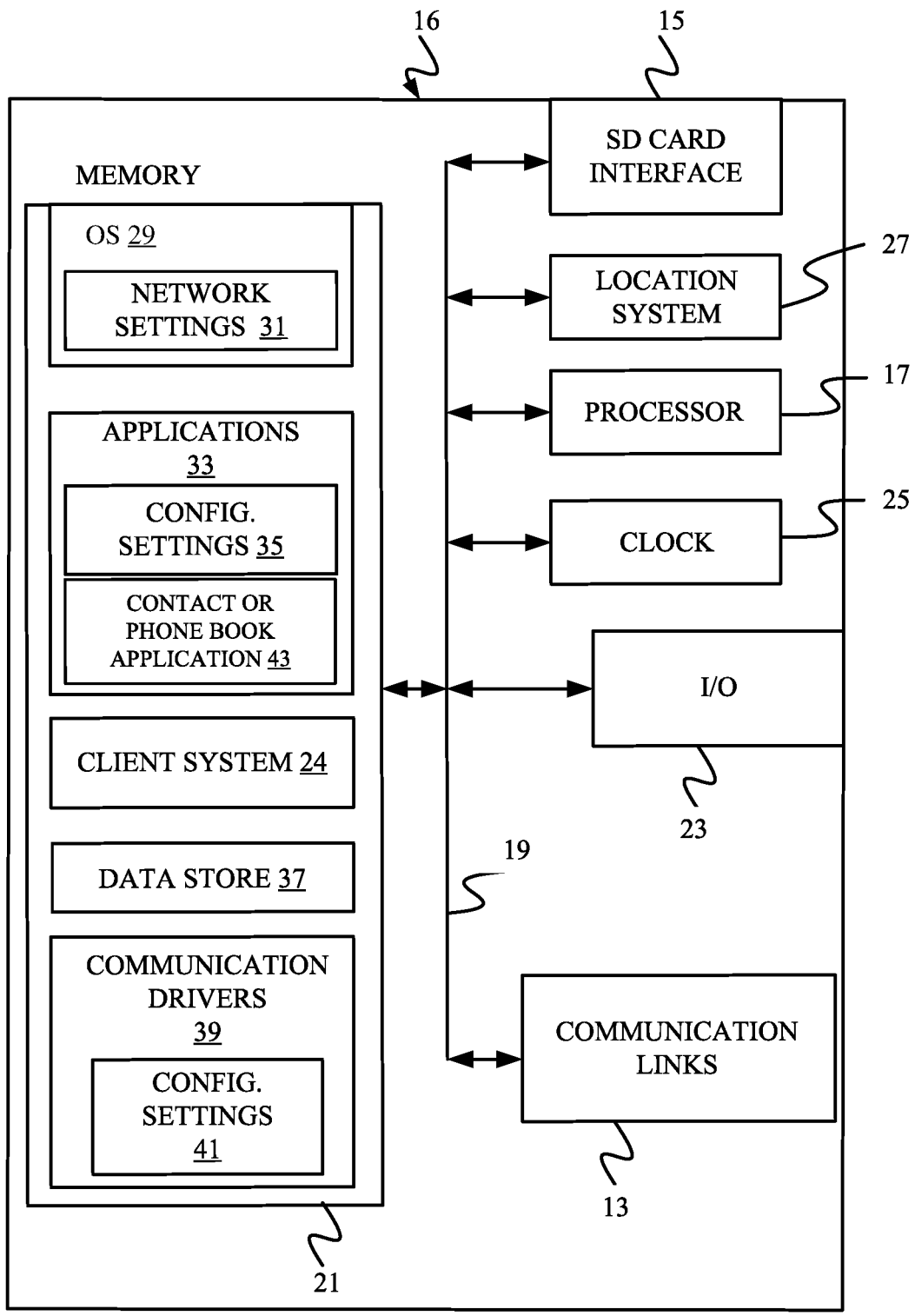
FIGS. 8-10 show examples of mobile devices that can be used in the architectures shown in the previous figures.
Figure 9:
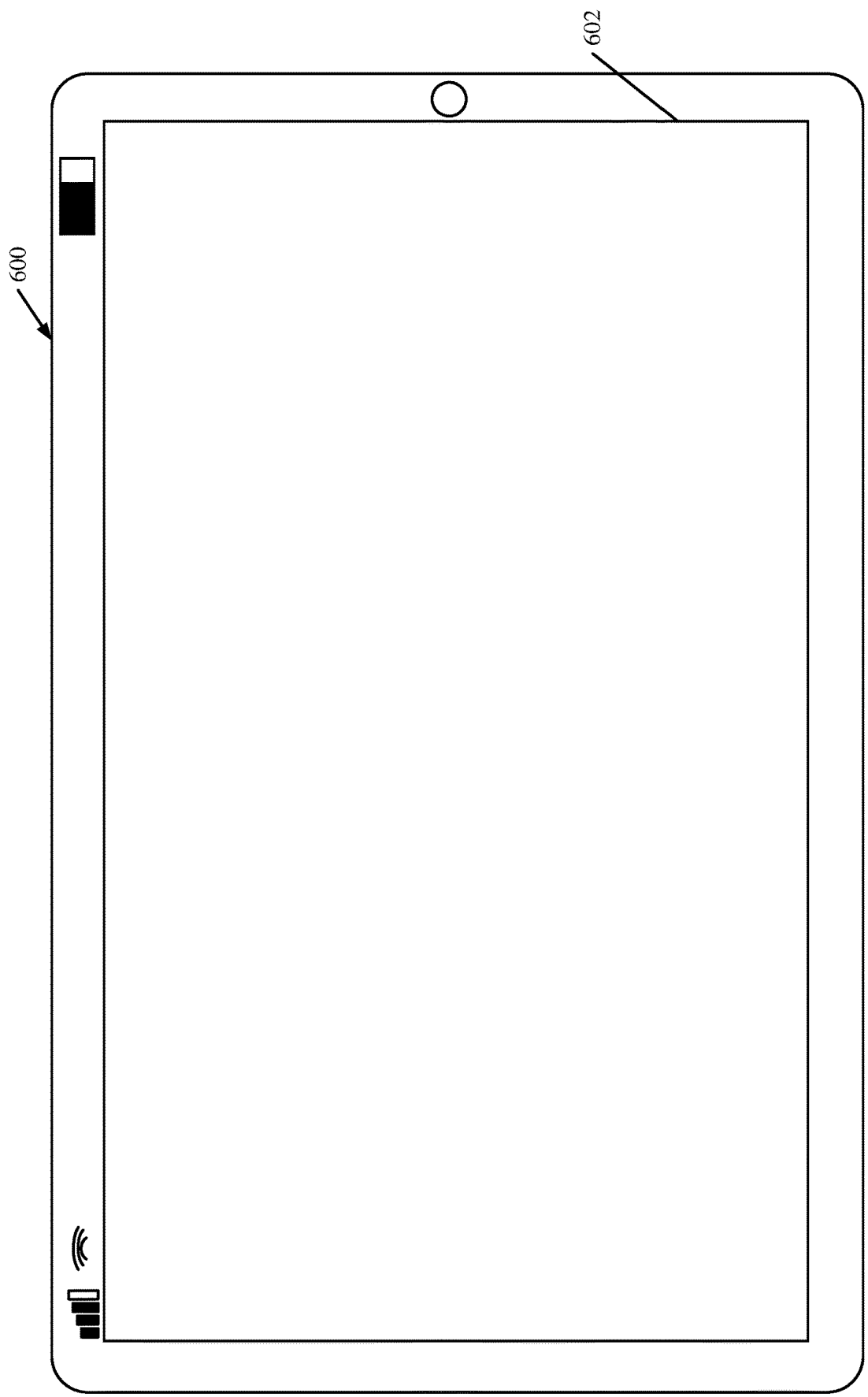
Figure 10:
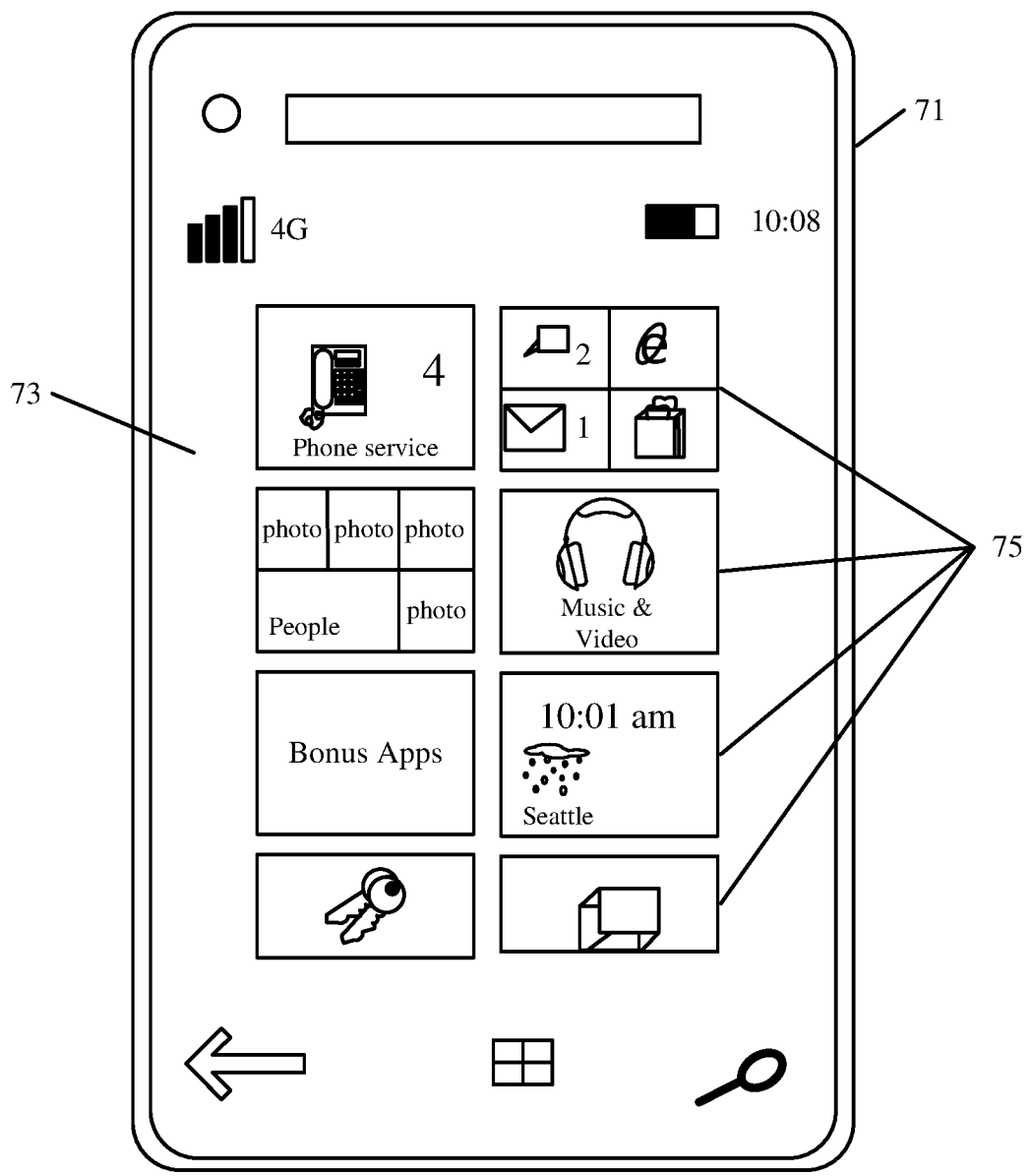

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components computing system 102 or user device 504 or system 116 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
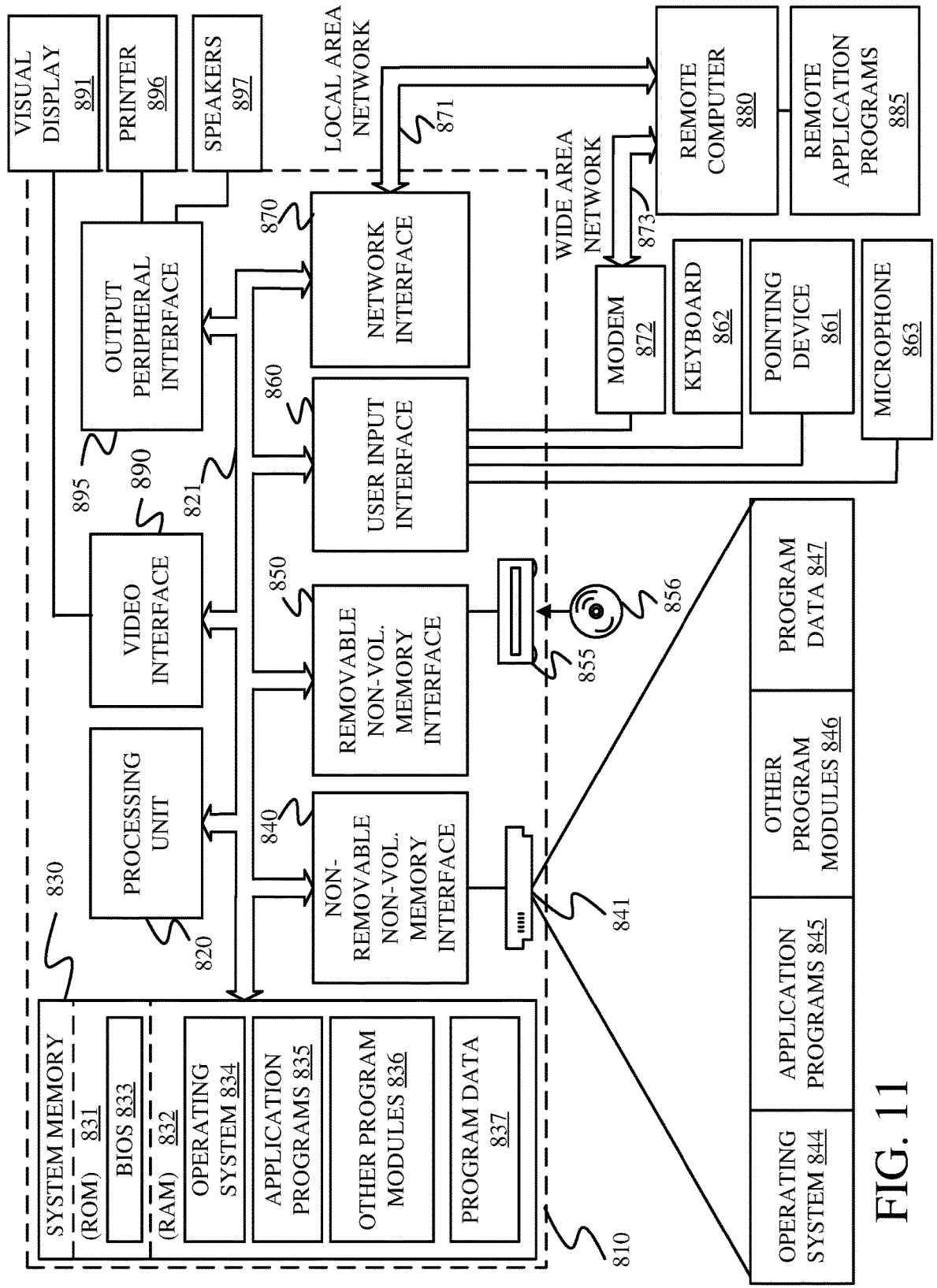
FIG. 11 is a block diagram showing one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a computing device in the form of a computer 810 that is specially configured to perform as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
at least one processor; and
memory that stores instructions which, when executed by the at least one processor, cause the at least one processor to implement:
a plurality of different text-to-content models each generating a content output based on a textual input from a presentation generation system, the textual input including a plurality of different textual elements;
a selection system that evaluates the content outputs of the plurality of different text-to-content models to determine whether any of the plurality of different text-to-content models provide a complete content output, that has a content element corresponding to each of the textual elements in the textual input, and, if so, provides the complete content output;
a model mixing system that, if none of the plurality of different text-to-content models provide the complete content output, mixes the content outputs from the plurality of different text-to-content models to obtain a complete content output; and
a suggestion output generator that outputs the complete content output for user interaction.

Example 2 is the computing system of any or all previous examples wherein the selection system comprises:

a model ranking system that generates a model ranking metric corresponding to each of the plurality of different text-to-content models, and that ranks the text-to-content models in a rank order based on the model ranking metrics.

Example 3 is the computing system of any or all previous examples wherein the selection system comprises:
model running logic configured to run the text-to-content models in rank order, on the textual input.

Example 4 is the computing system of any or all previous examples wherein the model ranking system comprises:
a quality metric generator that generates a model quality metric corresponding to each of the plurality of text-to-content models; and
a coverage metric generator that generates a coverage metric, indicative of an extent of data covered by the model, corresponding to each of the plurality of text-to-content models, wherein the model ranking system generates the model ranking metric corresponding to each of the plurality of text-to content models based on the corresponding quality metric and coverage metric.

Example 5 is the computing system of any or all previous examples wherein the text-to-content models each generate a content output based on the textual input and a confidence score indicating a model confidence in the content output Example 6 is the computing system of any or all previous examples wherein the selection system comprises:
a model evaluation system that evaluates the content outputs from each of the plurality of text-to-content models based on the model ranking metric and the model confidence score corresponding to each text-to-content model.

Example 7 is the computing system of any or all previous examples wherein the selection system comprises:
a model identification system that identifies a lifecycle state of each of the plurality of text-to-content models.

Example 8 is the computing system of any or all previous examples wherein the model ranking system is configured to rank the plurality of text-to-content models in the rank order based on the identified lifecycle state corresponding to each of the plurality of text-to-content models.

Example 9 is the computing system of any or all previous examples wherein the model mixing system is configured to access model mixing constraints to identify which of the plurality of different text-to-content models are mixable to obtain the complete content output Example 10 is the computing system of any or all previous examples wherein the model mixing system comprises:
model combination logic configured to combine the content outputs of different mixable models to obtain the complete content output.

Example 11 is the computing system of any or all previous examples wherein the textual input is text from a slide in a slide presentation that has a plurality of different slides and wherein the evaluation system comprises:
a cross-slide consistency identifier that identifies a consistency characteristic based on content outputs generated for textual inputs from other slides in the presentation and wherein the model evaluation system evaluates the content output based on the cross-slide consistency characteristic.

Example 12 is the computing system of any or all previous examples wherein the memory includes instructions which, when executed by the at least one processor cause the at least one processor to implement:
a machine learning model generation/training system that detects production data indicative of user interactions with the content outputs from the selection system and that iteratively trains the plurality of different text-to-content models based on the detected production data.

Example 13 is a computing system, comprising:
at least one processor; and
memory that stores instructions which, when executed by the at least one processor, cause the at least one processor implement a plurality of different text-to-content models each generating a content output based on a textual input from a presentation generation system, the textual input including a plurality of different textual elements, the instructions, when implemented by the at least one processor, further causing the at least one processor to perform steps of:
evaluating the content outputs of the plurality of different text-to-content models to determine whether any of the plurality of different text-to-content models provide a complete content output, that has a content element corresponding to each of the textual elements in the textual input;
if any of the plurality of different text-to-content models provide the complete content output, outputting the complete content output for user interaction; and
if none of the plurality of different text-to-content models provide the complete content output, mixing the content outputs from the plurality of different text-to-content models to obtain a mixed complete content output and outputting the mixed complete content output for user interaction.

Example 14 is the computing system of any or all previous examples wherein evaluating comprises:
generating a model ranking metric corresponding to each of the plurality of different text-to-content models;
ranking the text-to-content models in a rank order based on the model ranking metrics; and
running the text-to-content models in rank order, on the textual input, based on the model ranking metric.

Example 15 is the computing system of any or all previous examples wherein running the text-to-content models comprises:
generating, with each text-to-content model, a content output based on the textual input and a confidence score indicating a model confidence in the content output Example 16 is the computing system of any or all previous examples wherein evaluating the content outputs comprises:
evaluating the content outputs from each of the plurality of text-to-content models based on the model ranking metric and the model confidence score corresponding to each text-to-content model, and wherein outputting the complete content output comprises outputting the complete content model based on the model ranking metric and the confidence score.

Example 17 is the computing system of any or all previous examples wherein ranking the text-to-content models comprises:
identifying a lifecycle state of each of the plurality of text-to-content models; and
ranking the plurality of text-to-content models in the rank order based on the identified lifecycle state corresponding to each of the plurality of text-to-content models.

Example 18 is the computing system of any or all previous examples wherein mixing the content outputs comprises:
accessing model mixing constraints to identify which of the plurality of different text-to-content models are mixable to obtain the mixed complete content output; and
combining the content outputs of different mixable models to obtain the complete content output.

Example 19 is the computing system of any or all previous examples wherein the textual input is text from a slide in a slide presentation that has a plurality of different slides and wherein evaluating the content outputs comprises:
identifying a consistency characteristic based on content outputs generated for textual inputs from other slides in the presentation; and
evaluating the content output based on the cross-slide consistency characteristic.

Example 20 is a computer implemented method, comprising:
receiving, at a plurality of different text-to-content models a textual input from a presentation generation system, the textual input including a plurality of different textual elements;
generating a content output with each of the plurality of different text-to-content models based on the textual input;
generating a confidence metric for each content output;
evaluating the content outputs of the plurality of different text-to-content models to determine whether any of the plurality of different text-to-content models provide a complete content output, that has a content element corresponding to each of the textual elements in the textual input;
if any of the plurality of different text-to-content models provide a complete content output, then ranking the complete content outputs based on the confidence metric and outputting, for user interaction, the content output based on the confidence metric; and
if none of the plurality of different text-to-content models provide the complete content output, mixing the content outputs from the plurality of different text-to-content models to obtain a mixed complete content output and outputting the mixed complete content output for user interaction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
at least one processor; and
memory that stores instructions which, when executed by the at least one processor, cause the at least one processor to implement:
a plurality of different text-to-content models, each model configured to generate a content output based on a textual input including a plurality of different textual elements;
a selection system configured to:
evaluate the content output of each of the plurality of different text-to-content models, and
based on the evaluation, determine whether any particular one of the plurality of different text-to-content models provides a given content output that has at least one content element corresponding to each of the textual elements in the textual input, and, if so, select the given content output as a complete content output;
a model mixing system configured to:
if none of the plurality of different text-to-content models provide a content output that has at least one content element corresponding to each of the textual elements in the textual input,
identify, based on a model mixing constraint, first and second text-to-content models of the plurality of different text-to-content models, obtain a first content output from the first text-to-content model that corresponds to at least a first one of the textual elements in the textual input, obtain a second content output from the second text-to-content model that corresponds to at least a second one of the textual elements that is different than the first textual element in the textual input, and obtain a complete content output by mixing the first and second content outputs; and a suggestion output generator configured to output the complete content output.

2. The computing system of claim 1 wherein the selection system comprises:

a model ranking system configured to:

generate a model ranking metric corresponding to each of the plurality of different text-to-content models, and rank the text-to-content models in a rank order based on the model ranking metrics.

3. The computing system of claim 2 wherein the selection system comprises:

model running logic configured to run the text-to-content models in rank order, on the textual input.

4. The computing system of claim 3 wherein the model ranking system comprises:

a quality metric generator configured to generate a model quality metric corresponding to each of the plurality of text-to-content models; and a coverage metric generator configured to generate a coverage metric, indicative of an extent of data covered by the model quality metric, corresponding to each of the plurality of text-to-content models, wherein the model ranking system is configured to generate the model ranking metric corresponding to each of the plurality of text-to content models based on the corresponding quality metric and coverage metric.

5. The computing system of claim 4 wherein the text-to-content models each generate a content output based on the textual input and a confidence score indicating a model confidence in the content output, the selection system comprises:

a model evaluation system configured to evaluate the content outputs from each of the plurality of text-to-content models based on the model ranking metric and the model confidence score corresponding to each text-to-content model, and the suggestion output generator is configured to generate a user interface that renders the complete content output to a user and includes a user input mechanism configured to receive a user interaction input corresponding to the complete content output.

6. The computing system of claim 2, wherein the selection system comprises:

a model identification system that identifies a lifecycle state of each of the plurality of text-to-content models, and the model ranking system is configured to rank the plurality of text-to-content models in the rank order based on the identified lifecycle state corresponding to each of the plurality of text-to-content models.

7. The computing system of claim 6 wherein the textual input comprises text from a slide in a slide presentation that has a plurality of different slides, and the model evaluation system comprises:

a cross-slide consistency identifier that identifies a consistency characteristic based on content outputs generated for textual inputs from other slides in the presentation and wherein the model evaluation system evaluates the content output based on the cross-slide consistency characteristic.

8. The computing system of claim 1, wherein the first content output generated by the first text-to-content model, comprises a different content type from the second content output generated by the second text-to-content model.

9. The computing system of claim 8, wherein each of the first and second text-to-content models comprises a different one of:

a text-to-icon model configured to generate an icon based on the textual input from the presentation generation system, a text-to-image model configured to generate an image based on the textual input from the presentation generation system, or a text-to-emoji model configured to generate an emoji based on the textual input from the presentation generation system.

10. The computing system of claim 1, wherein the model mixing system is configured to access a set of model mixing constraints to identify which of the plurality of different text-to-content models are mixable to obtain the complete content output.

11. The computing system of claim 10, wherein the model mixing system comprises:

model combination logic configured to combine the content outputs of different mixable models to obtain the complete content output.

12. The computing system of claim 1 wherein the memory includes instructions which, when executed by the at least one processor cause the at least one processor to implement:

a machine learning model generation/training system that configured to detect production data indicative of user interactions with the content outputs from the selection system and iteratively train the plurality of different text-to-content models based on the detected production data.

13. A method performed by a computing system, the method comprising:

implementing a plurality of different text-to-content models, each model generating a content output based on a textual input including a plurality of different textual elements;

evaluating the content output of each of the plurality of different text-to-content models;

based on the evaluation, determining that none of the plurality of different text-to-content models provides a given content output that has at least one content element corresponding to each of the textual elements in the textual input;

based on the determination, identifying first and second text-to-content models of the plurality of different text-to-content models based on a model mixing constraint;

obtaining a first content output from the first text-to-content model that corresponds to at least a first one of the textual elements in the textual input:

obtaining a second content output from the second text-to-content model that corresponds to at least a second one of the textual elements that is different than the first textual element in the textual input;

mixing the first and second content outputs to obtain a mixed complete content output that has a content element corresponding to each of the textual elements in the textual input; and outputting the mixed complete content output.

14. The method of claim 13 wherein evaluating comprises:

generating a model ranking metric corresponding to each of the plurality of different text-to-content models;

ranking the text-to-content models in a rank order based on the model ranking metrics; and running the text-to-content models in rank order, on the textual input, based on the model ranking metric.

15. The method of claim 14, wherein running the text-to-content models comprises:

generating, with each text-to-content model, a content output based on the textual input and a confidence score indicating a model confidence in the content output.

16. The method of claim 15, wherein evaluating the content output of each text-to-content model comprises:

evaluating the content outputs from each of the plurality of text-to-content models based on the model ranking metric and the model confidence score corresponding to each text-to-content model, and wherein outputting the complete content output comprises outputting the complete content model based on the model ranking metric and the confidence score.

17. The method of claim 13, wherein the first content output generated by the first text-to-content model comprises a different content type from the second content output generated by the second text-to-content model.

18. The method of claim 17, wherein each of the first and second text-to-content models comprises a different one of:

a text-to-icon model configured to generate an icon based on the textual input from the presentation generation system, a text-to-image model configured to generate an image based on the textual input from the presentation generation system, or a text-to-emoji model configured to generate an emoji based on the textual input from the presentation generation system.

19. The method of claim 13, wherein mixing the content outputs comprises:

accessing a set of model mixing constraints to identify which of the plurality of different text-to-content models are mixable to obtain the mixed complete content output; and combining the content outputs of different mixable models to obtain the complete content output.

20. A computer implemented method, comprising:

receiving, at a plurality of different text-to-content models a textual input from a presentation generation system, the textual input including a plurality of different textual elements;

generating a content output with each of the plurality of different text-to-content models based on the textual input;

generating a confidence metric for each content output;

evaluating the content outputs of the plurality of different text-to-content models to determine whether any of the plurality of different text-to-content models provide a complete content output, that has a content element corresponding to each of the textual elements in the textual input;

if any of the plurality of different text-to-content models provide a complete content output, then ranking the complete content outputs based on the confidence metric and outputting, for user interaction, the content output based on the confidence metric; and if none of the plurality of different text-to-content models provide the complete content output, mixing the content outputs from the plurality of different text-to-content models to obtain a mixed complete content output and outputting the mixed complete content output for user interaction.

* * * * *